(12) United States Patent
Allenberg

(10) Patent No.: US 9,291,489 B2
(45) Date of Patent: Mar. 22, 2016

(54) METHOD FOR THE GRAVIMETRIC MASS METERING OF BULK SOLIDS AND DIFFERENTIAL METERING SCALE

(71) Applicant: Schenck Process GmbH, Darmstadt (DE)

(72) Inventor: Bernd Allenberg, Muehltal (DE)

(73) Assignee: Schenck Process GmbH, Darmstadt (DE)

( * ) Notice: Subject to any disclaimer, the term of this patent is extended or adjusted under 35 U.S.C. 154(b) by 48 days.

(21) Appl. No.: 14/302,833

(22) Filed: Jun. 12, 2014

(65) Prior Publication Data

US 2014/0290384 A1 Oct. 2, 2014

Related U.S. Application Data

(63) Continuation of application No. PCT/EP2012/005010, filed on Dec. 5, 2012.

(30) Foreign Application Priority Data

Dec. 12, 2011 (DE) .......................... 10 2011 120 728

(51) Int. Cl.
*G01G 11/08* (2006.01)
*G01F 1/80* (2006.01)

(52) U.S. Cl.
CPC ................ *G01F 1/80* (2013.01); *G01G 11/086* (2013.01)

(58) Field of Classification Search
None
See application file for complete search history.

(56) References Cited

U.S. PATENT DOCUMENTS

| 3,635,082 | A |  | 1/1972 | Prellwitz et al. |
| 4,238,956 | A |  | 12/1980 | Sniezek et al. |
| 4,509,366 | A |  | 4/1985 | Matsushita et al. |
| 5,132,897 | A | * | 7/1992 | Allenberg ............ G01G 13/248 177/59 |
| 2004/0255692 | A1 |  | 12/2004 | Shyy et al. |
| 2008/0244986 | A1 |  | 10/2008 | Adelmann et al. |
| 2009/0133507 | A1 | * | 5/2009 | Wolfschaffner .......... F23K 3/02 73/861.351 |

FOREIGN PATENT DOCUMENTS

| DE | 2018618 | 11/1970 |
| DE | 33 15 476 A1 | 11/1983 |

(Continued)

OTHER PUBLICATIONS

Henrici et al., *Handbuch Dosieren* (Metering Handbook), ISBN 3-8027-2199-3, Chapter "Durchaufdosiergeraete fuer Schuettgueter" ("Flow Meter Devices for Bulk Solids"), pp. 418-433 (2001).

(Continued)

*Primary Examiner* — Harshad R Patel
(74) *Attorney, Agent, or Firm* — Muncy, Geissler, Olds & Lowe, P.C.

(57) ABSTRACT

A method for the gravimetric mass metering of bulk solids via a container with the bulk solid to be metered and a volumetric conveying device, via which the bulk solid coming from the container with a mass flow, which chronologically follows a target value for a target feed rate, is conveyed, and a differential metering scale suitable for such purpose. The bulk solid, after leaving the conveying device can pass through a mass flow measuring device and the mass flow measuring device calculates a second signal representing the mass flow, and based on the second signal representing the mass flow and the first control signal, a second control device calculates a second signal and delivers the signal to a drive of the conveying device for controlling the conveying device.

20 Claims, 5 Drawing Sheets

(56) References Cited

FOREIGN PATENT DOCUMENTS

| | | |
|---|---|---|
| DE | 44 06 046 A1 | 8/1995 |
| DE | 10 2006 052 637 A1 | 5/2008 |
| DE | 10 2010 009 753 A1 | 9/2011 |
| EP | 0 669 522 A2 | 8/1995 |
| WO | WO 2008/055485 A1 | 5/2008 |

OTHER PUBLICATIONS

Doetsch et al., *Handbuch Dosieren* (Metering Handbook), ISBN 3-8027-2199-3, Chapter "Dosierdifferentialwaagen" ("Differential metering scales"), pp. 341-364 (2001).

Haefner et al., *Handbuch Dosieren* (Metering Handbook), ISBN 3-8027-2199-3, Pages "Dosierrotorwaagen", pp. 314-315 (2001) with English translation of relevant paragraph.

\* cited by examiner

METHOD FOR THE GRAVIMETRIC MASS METERING OF BULK SOLIDS AND DIFFERENTIAL METERING SCALE

This nonprovisional application is a continuation of International Application No. PCT/EP2012/005010, which was filed on Dec. 5, 2012, and which claims priority to German Patent Application No DE 10 2011 120 728.0, which was filed in Germany on Dec. 12, 2011, and which are both herein incorporated by reference.

BACKGROUND OF THE INVENTION

1. Field of the Invention

The present invention relates to a method for the gravimetric mass metering of bulk solids and a differential metering scale suitable therefor.

2. Description of the Background Art

As is generally known, differential metering scales, also known as loss-in-weight scales, are often used for the gravimetric mass metering of bulk solids. The principle thereof, cf., e.g., Vetter: "Handbuch Dosieren" [Metering Handbook], ISBN 3-8027-2199-3; Chapter "Differential metering scales," is physically very simple and theoretically free of error.

There are two major problems, however, with traditionally designed differential metering scales.

On the one hand, the container must be refilled after some time, which as a rule occurs at an unknown feed rate. During this time, the feed rate from the container cannot be determined from the change in weight over time and the changes in bulk density in the discharge device result in errors in the mass flow.

On the other hand, the container weight can be determined only with measurement errors. These errors must therefore be suppressed, so that they do not lead to an incorrect control signal in the metering unit. To this end, a low-pass filter is usually employed as a differential filter. However, the greater the interferences in relation to the weight loss due to the bulk solids discharge, the lower the cut-off frequency of the filter has to be set. This setting leads to a considerable reduction in the correction speed for rapid changes in the bulk density in the discharge or conveying device, which discharges or conveys away the bulk solids coming out of the container. This problem occurs even more pronounced in the metering of adhering and fine-grained bulk solids with a low feed rate and in addition relatively large differential metering scales with a high tare load.

The mentioned problems arise particularly in the case of differential metering scales in which the gravimetric discharge or feed output has a relationship, varying greatly over time, to the volumetric discharge output because of the flow properties. This is particularly the case in highly adhering or fine-grained bulk solids, which can be discharged with variable success from the container. These problems are known to users of differential metering scales and a solution to the problems has been long sought. Because of the noted problems with differential metering scales, there are very many other measuring techniques on the market for the flow measuring of bulk solids, e.g., belt scales, screw scales, Coriolis measuring systems, measuring systems utilizing changes in momentum in the bulk material flow, and measuring techniques that utilize other physical effects, to determine weight, e.g., electromagnetic techniques, cf., e.g., also Vetter: "Handbuch Dosieren," ISBN 3-8027-2199-3; Chapter "Flow Metering Devices for Bulk Solids". The publications DE 44 06 046 C2, WO 2008/055485 A1, U.S. Pat. No. 3,635,082, DE 20 18 618 A1, DE 33 15 476 A1, EP 0 669 522 A2, and DE 10 2006 052 637 A1 also describe different devices and methods for measuring the flow of media.

All of these measuring systems are either very costly to produce, when they are to have only low measurement errors or have a cross-sensitivity for other parameters as a matter of principle because of the employed physical effect; this then leads to considerable measurement errors. Efforts have already been made in many techniques to reduce the measurement errors to the necessary degree at considerable cost and with some limited success.

SUMMARY OF THE INVENTION

It is therefore an object of the present invention to provide an approach with which the aforementioned disadvantages are reduced, preferably totally eliminated.

In an embodiment, the invention provides a method for the gravimetric mass metering of bulk solids by means of a container with the bulk solid to be metered and a volumetric conveying device, with which the bulk solid coming from the container is conveyed with a mass flow, which temporally follows a target value for a target feed rate. To determine the mass flow, a signal is determined, which represents the total weight of a unit formed by the container and the included bulk solid, or by the container and discharge device and the included bulk solid. Next, the signal is processed specifically for the system and/or bulk solid, particularly differentiated and filtered, in order to calculate a first signal representing the mass flow, from which a first control signal is calculated together with the target value for the target feed rate. After the mass flow leaves the conveying device, a second signal, representing the mass flow, is measured and a second control signal is calculated based on the second signal, representing the mass flow, and the first control signal, and supplied to a drive of the conveying device for controlling the conveying device.

A differential metering scale suitable for this, according to invention, comprises a container with the bulk solid to be metered and a volumetric conveying device, with which the bulk solid coming from the container is conveyed with a mass flow, which temporally follows a target value for a target feed rate. Further, the differential metering scale according to the invention comprises a weight determining unit and a differential filter device, which further comprises a first regulating device. The weight determining unit is designed to determine the total weight of a unit formed by a container and the included bulk solid or by a container and discharge device and the included bulk solid, and outputs a signal representing said total weight and transmits it to the differential filter device. The differential filter device is designed to calculate a first signal, representing the mass flow, from this signal representing the total weight. One of the closed loop controllers calculates a first control signal from the signal, representing the mass flow, and the target value for the feed rate. In addition, the differential metering scale comprises a second regulating device and a mass flow measuring device, whereby the mass flow measuring device is designed and disposed such that the bulk solid after leaving the conveying device can pass through said mass flow measuring device and the mass flow measuring device calculates a second signal representing the mass flow. The second regulating device calculates a second control signal based on the second signal, representing the mass flow, and the first control signal and supplies it to a drive of the conveying device for controlling the conveying device.

The invention thus makes it possible that even during the filling phase the actual bulk solid flow from the container can be regulated (closed loop) and not only controlled (open loop). Furthermore, a rapid closed loop regulation also occurs when the differential filter device must have a differential filter with a very low cut-off frequency because of interferences.

The method of the invention for the gravimetric mass metering of bulk solids and the differential metering scale of the invention thus combine the differential weighing principle with a mass flow measuring device. This increases the cost for the differential metering scale of the invention only negligibly but creates a considerable benefit for the user.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention wily become more fully understood from the detailed description given hereinbelow and the accompanying drawings which are given by way of illustration only, and thus, are not limitive of the present invention, and wherein.

DETAILED DESCRIPTION

Figure 5:
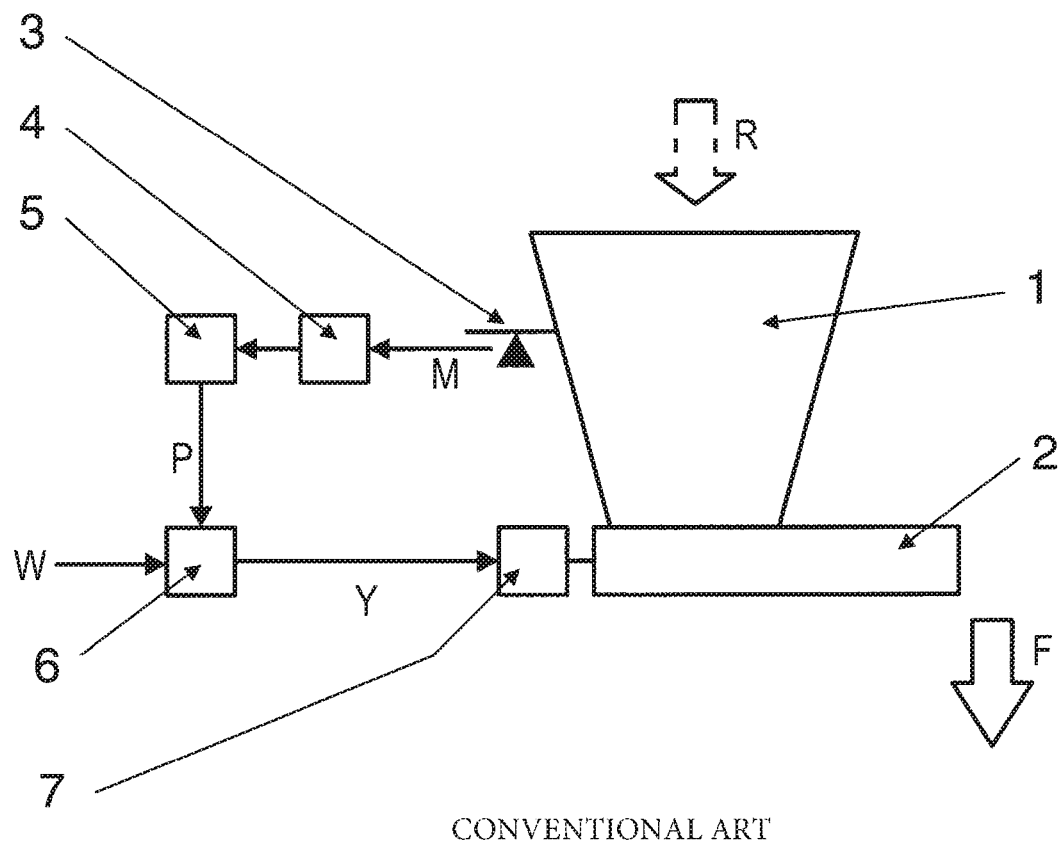
FIG. 5 is a schematic sketch of a differential metering scale.

First a differential metering scale according to the conventional art will be discussed below with the use of FIG. 5. A differential metering scale for the continuous metering of bulk solids, as sketched in FIG. 5, has a container 1 with the bulk solid to be metered and a volumetric discharge or conveying device 2, with which the bulk solid is discharged with a discharge flow F, which temporally follows a target value W, or is conveyed away coming from container 1. A discharge device therefore is also equivalent to a conveying device in the entire description and in the claims. To determine the discharge flow F, also equivalent to the feed flow or mass flow in the entire description and in the claims, the total weight of a unit formed by container 1 and the bulk solid included hereby or by container 1 and discharge device 2 and the bulk solid included hereby is determined by a weight determining unit 3. A signal M representing said total weight is then transmitted from weight determining unit 3 to a differentiation unit 4 and differentiated by differentiation unit 4. A signal provided thereupon at the output of differentiation unit 4 is transmitted to a filter unit 5, in which the signal transmitted by differentiation unit 4 is filtered according to at least one algorithm, expediently according to various algorithms, in order to calculate a signal P corresponding as well as possible to the actual feed flow F. This signal P, called the first signal representing the mass flow below, and a target value W for the feed rate are supplied to a regulating device 6. Said regulating device 6 calculates a control signal Y from the first signal P, representing the mass flow, and the target value W.

The control signal Y is supplied to a drive 7 of discharge device 2. The volume flow of discharge device 2 is set in this way so that the gravimetric output flow F follows the target value W as well as possible.

When container 1 has reached a bottom limit filling level, a filling R, also called refilling R, is started, until the filling level has reached or exceeded an upper limit filling level. During the refilling period, closed loop controller 6 is switched so that it outputs control signal Y matching the currently determined total weight in the container. The closed loop control for the feed rate is thus interrupted during the refilling; i.e., changes in the bulk density in discharge device 2 during this period of refilling lead to deviations of the feed flow F from target value W.

Figure 1:
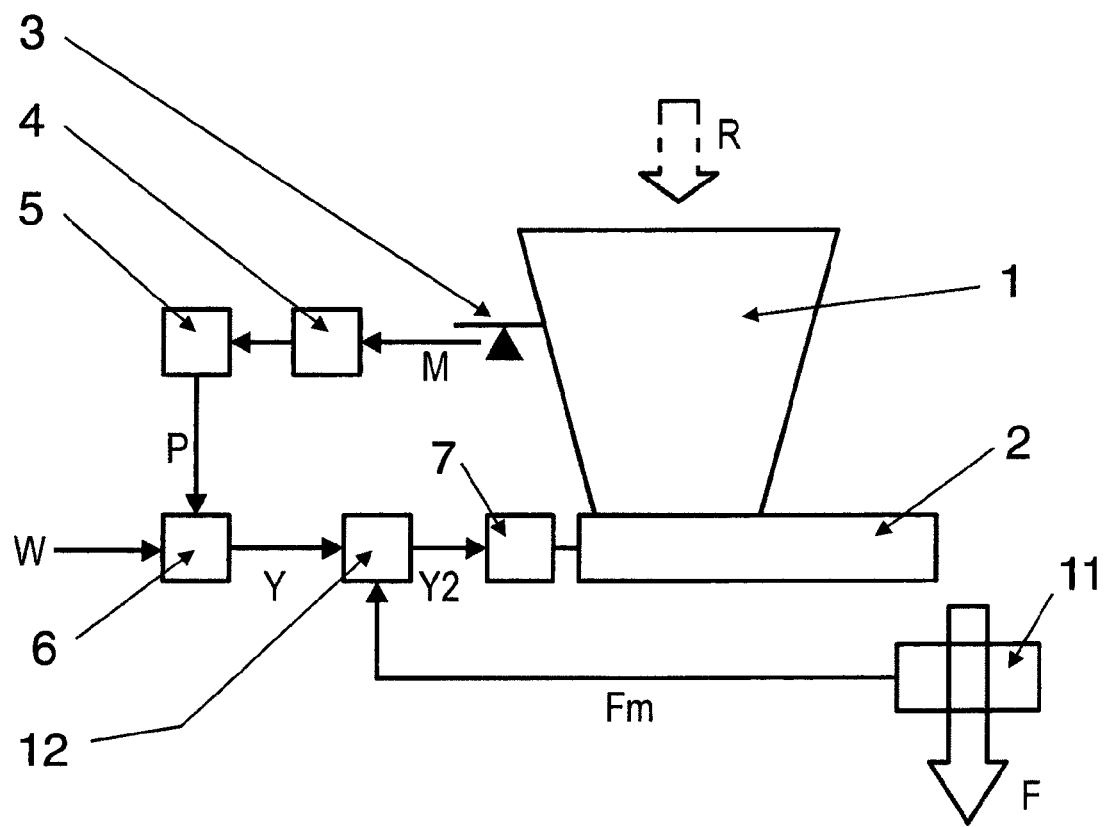
FIG. 1 is a schematic sketch of an embodiment of a differential metering scale of the invention for carrying out a method of the invention for gravimetric mass metering.
Figure 3:
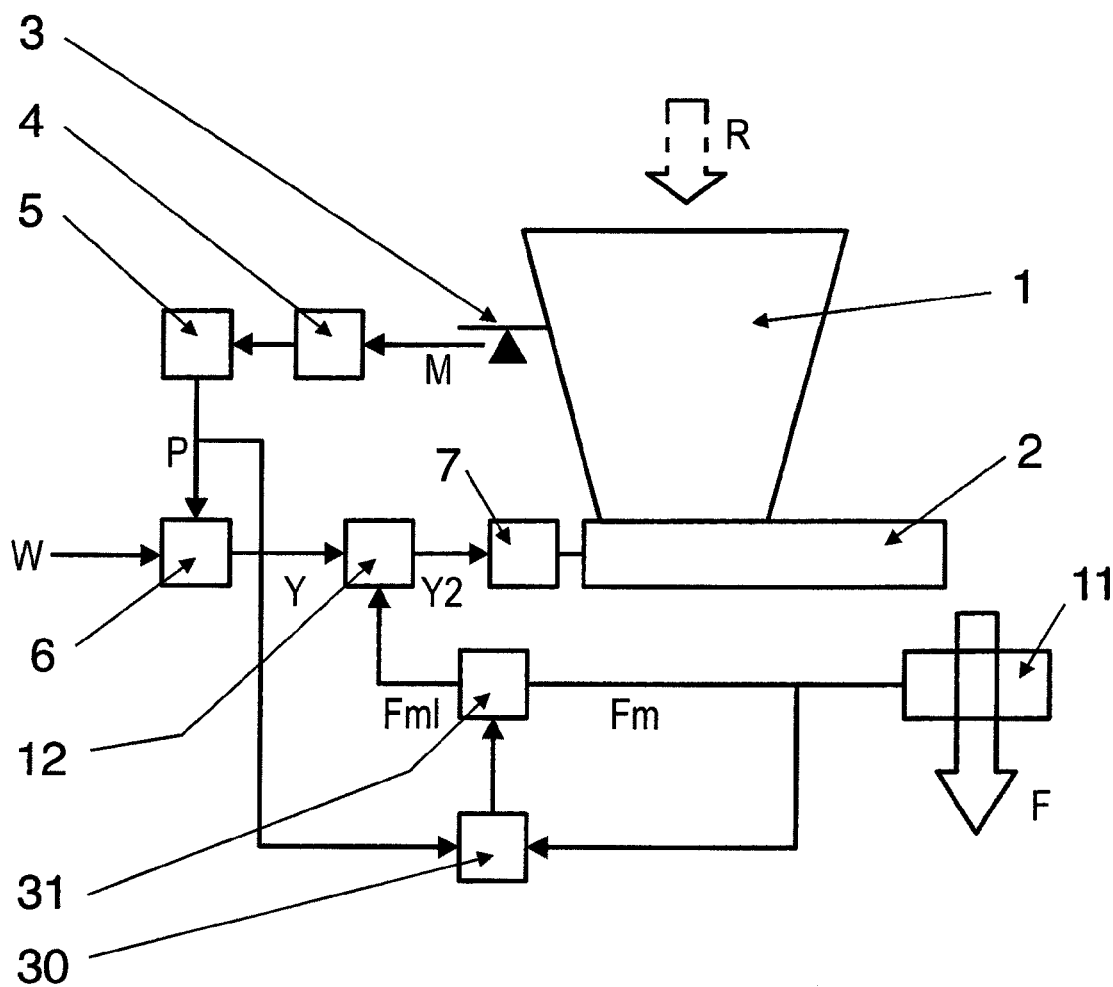
FIG. 3 is a schematic sketch of an embodiment of a differential metering scale of the invention for carrying out a method of the invention for gravimetric mass metering.

The invention now also provides a method for the gravimetric mass metering of bulk solids by means of a container 1 with the bulk solid to be metered and a volumetric conveying device 2, with which the bulk solid coming from the container is conveyed with a mass flow F, which temporally follows a target value W for a target feed rate, whereby, e.g., according to the embodiments according to FIGS. 1 and 3 for determining said mass flow F a signal M is determined, which represents the total weight of a unit formed by container 1 and the included bulk solid or by container 1 and discharge device 2 and the included bulk solid, the signal M is then processed, particularly differentiated, and filtered specifically for the system and/or bulk solid, in order to calculate a first signal P representing the mass flow, from which a first control signal Y is calculated together with the target value W for the target feed rate.

Expediently, a differential metering scale, provided by the invention and suitable for carrying out this method, for this purpose has container 1 with the bulk solid to be metered and volumetric conveying device 2, with which the bulk solid can be conveyed coming from the container with a mass flow F, which temporally follows a target value W for a target feed rate. The differential metering scale furthermore has a weight determining unit 3 and a differential filter device, which comprises further a first regulating device 6, whereby weight determining unit 3 is designed to determine the total weight of a unit formed by container 1 and the bulk solid included hereby, or by container 1 and discharge device 2 and the bulk solid included hereby, and outputs a signal M representing said total weight and transmits it to the differential filter device, and whereby the differential filter device is designed to calculate a first signal P, representing the mass flow, from the signal M via a weight change over time A closed loop controller 6 calculates a first control signal Y from the first signal P, representing the mass flow, and the target value (W) for the feed rate.

According to the embodiments according to FIGS. 1 and 3, the differential filter device expediently comprises a differentiation unit 4 and a filter unit 5. Differentiation unit 4 differentiates the signal M output by weight determining unit 3, transmits this differential signal to filter unit 5, which filters the transmitted signal according to at least one algorithm, in order to calculate the first signal P representing the feed flow. In order for the calculated signal P already corresponding as well as possible to the actual feed flow F, filter unit 5 expediently filters using various algorithms. First regulating device 6 finally calculates the first control signal Y from the first signal P, representing the mass flow, and a target value W for the feed rate. First regulating device 6 can be designed as a PI controller, but in other forms can also contain basically any type of closed or open loop controllers that can calculate a first control signal Y suitable for a particular differential metering scale.

However, contrary to the state of the art according to the invention this first control signal Y is not supplied directly to drive 7 of discharge device 2.

According to an exemplary embodiment of the invention, it is provided, in contrast, that after the mass flow F leaves conveying device 2, a second signal Fm representing the mass flow F is measured, and based on the second signal Fm, representing the mass flow F, and the first control signal Y, a second control signal Y2 is calculated and supplied to a drive 7 of conveying device 2 for controlling conveying device 2.

According to an exemplary embodiment of the invention, for this purpose the differential metering scale is expanded by a second regulating device 12 and a mass flow measuring device 11, which is also designated below as the feed flow measuring device. Mass flow measuring device 11 is designed and disposed such that the bulk solid after leaving conveying device 2, and therefore the feed flow or mass flow F can pass through this mass flow measuring device 11, whereby mass flow measuring device 11 calculates a second signal Fm representing, the mass flow. Second regulating device 12 receives as the target value the first control signal Y, determined by first regulating device 6, and calculates a second control signal Y2 based on the second signal Fm, representing the mass flow, and the first control signal Y. According to the embodiment in FIG. 1, for this purpose mass flow measuring device 11 supplies to second regulating device 12 the second signal Fm representing the mass flow. The second control signal Y2 is supplied to drive 7 of conveying device 2 for controlling conveying device 2 and therefore for setting the mass flow F to be conveyed.

Second regulating device 12 is thus arranged between first regulating device 6 and drive 7 of conveying device 2. It is pointed out, however, that second regulating device 12 can also be an output-side component of first regulating device 6.

Regarded purely in terms of closed loop control technology, the invention thus utilizes a cascade of two closed loop circuits known from other technical applications.

Advantageously, high requirements for accuracy do not need to be placed on the feed flow or mass flow measuring device 11, because the closed loop control of the feed flow occurs at a higher level by first regulating device 6.

It is noted that the signal Fm is thus not subject to excessive error fluctuations, which could lead to instabilities in second regulating device 12.

Signal changes in the signal Fm, which are based on slowly changing measurement errors of mass flow measuring device 11, which can be caused, e.g., by temperature changes and/or humidity changes, are eliminated via the superimposed closed loop circuit and closed loop controller 6.

However, rapid changes in mass flow can be corrected effectively and rapidly in second regulating device 12 of an embodiment variant according to FIG. 1.

The measured signal Fm must increase monotonically or decrease monotonically with the real mass flow F. A constant slope dFm/dF is not absolutely necessary, but facilitates the work of regulating devices 6 and 12. A precise adjustment of mass flow measuring device 11 is also not necessary.

If the measured signal Fm follows the actual mass flow F noticeably faster than the signal P, as described above, the dynamics of the entire system can also be accelerated, with the result that the actual mass flow F follows the target value W much more rapidly. At a constant target value W, the metering constancy as a standard deviation of the mass flow F is therefore greatly reduced, which represents a major advantage, when the mass flow F is supplied to a subsequent process that cannot tolerate changes in mass flow.

In each case, consequently the feed rate is also determined and controlled during the filling or refilling R. Rapid changes in the bulk density in discharge device 2 do therefore not cause errors in the gravimetric mass flow F.

Because of the reduced accuracy requirement for mass flow measuring device 11, said device therefore can be built very simply. Of course, known mass flow measuring devices, cf., e.g., also Vetter: "Handbuch Dosieren," ISBN 3-8027-2199-3; Chapter "Flow Metering Devices for Bulk Solids," with an increased accuracy can also be used. This is especially of interest when the refill phase lasts relatively long and thus the requirements for the stability of measurement values of mass flow measuring device 11 increase.

It is also advantageous to install mass flow measuring device 11 as close as possible below a dropping point provided for the mass flow of conveying device 2, so that only a short time passes from the leaving of conveying device 2 to the determination of the measured signal Fm. As a result, the dynamics of the closed loop control is optimized via second regulating device 12; i.e., it can be set with still higher dynamics.

According to an exemplary embodiment of the invention, a very simple mass, flow measuring device 11 can be designed such that it determines the second signal Fm, representing the mass flow F, from a capacitance C dependent on the bulk density between the electrodes. According to the sketched embodiment in FIG. 2, e.g., the mass flow F is passed from discharge device 2 through a device with two electrodes 20a and 20b. Electrodes 20a and 20b are configured, e.g., as plate-like electrodes. The capacitance C of the electrical capacitor formed by the two electrodes 20a and 20b can be determined using known methods, whereby advantageously the impedance of the capacitor formed by electrodes 20a and 20b for high-frequency signals is determined in order to calculate the capacitance from it. Because the capacitance depends further on the relative permittivity $\in_r$ of the material between electrodes 20a and 20b, areas in which bulk solid is located have a higher relative permittivity $\in_r$ than areas in which there is only air. Thus, the capacitance C depends on the bulk solids amount between electrodes 20a and 20b.

The feed flow F within feed flow measuring device 11 results from the velocity of the bulk solid and the amount between the plates. If the device is operated at a constant feed flow, the fall velocity is constant at the point of the feed flow measuring device in free fall. Because the feed flow measuring device when used as taught by the invention need not produce an absolutely precise measured value, a signal Fm proportional to the feed flow results from the determined capacitance C.

The permittivity of the bulk solid depends further on various material properties. Because according to experience these properties change only slowly, the signal Fm for the capacitance C with these changes therefore produces a measure sufficiently stable for a brief period for the feed flow.

It is furthermore advantageous to install electrodes 20a and 20b close to the mass flow dropping point of discharge device 2, also because there, due to the still low flow rate of the bulk solid, the quantity of material and therefore the relative material density in air and therefore the effect on the capacitance C are especially high.

The electrodes, therefore also the two electrodes 20a and 20b of the capacitor, can be configured planar or curved and therefore adapted to the region adjacent to the mass flow dropping point, whereby this usually is a conveying tube. The size and position of the electrodes can be expediently selected by methods known to the person skilled in the art advantageously so that the change in capacitance due to the bulk solid is as great as possible. Simultaneously, the position is expediently selected so that the feed flow F of the bulk solid is not impeded, preventing clogging in the conveying region.

Figure 4:
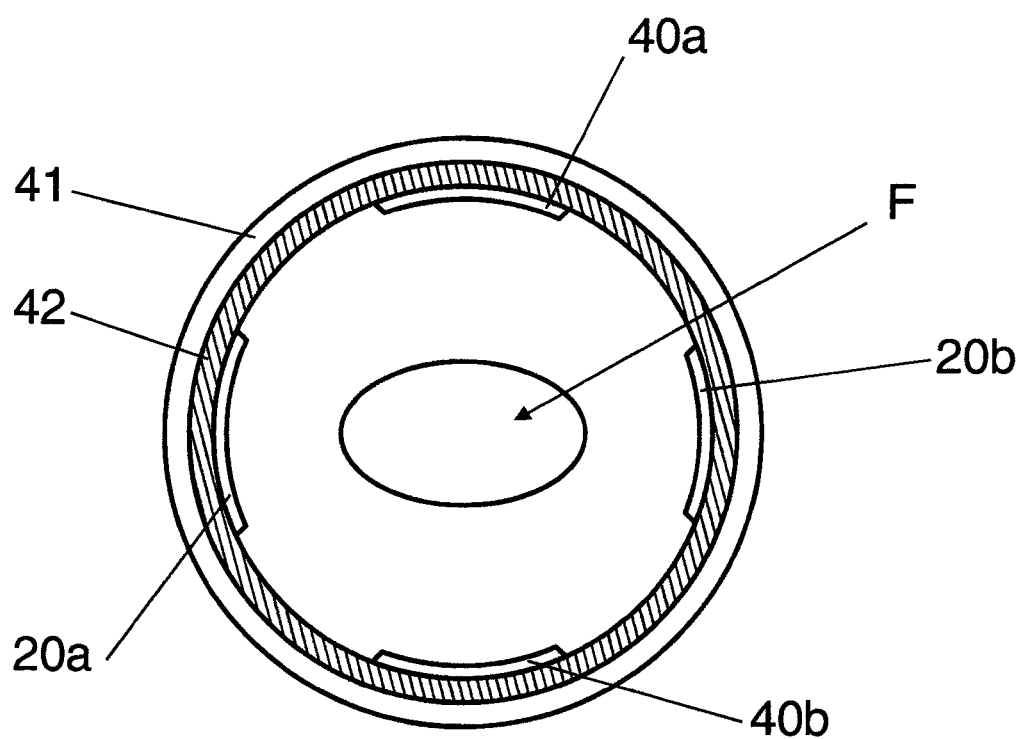
FIG. 4 is a schematic sketch of an embodiment of a mass flow measuring device within a differential metering scale of the invention for carrying out a method of the invention for gravimetric mass metering.

Furthermore, additional electrode pairs can be arranged to detect the mass flow, crossing mass flow measuring device 11 in a different direction. FIG. 4 shows, e.g., a preferred embodiment of a suitable arrangement in a horizontal section behind the mass flow dropping point of discharge device 2 in the example of a cylindrical arrangement within a conveying tube, i.e., for conveying the feed flow F in feed tube 41 disposed in the region adjacent to the mass flow dropping point. A dielectric tube 42, which supports electrode pair 20a and 20b and a further pair of electrodes 40a and 40b, is introduced into the shown feed tube 41. The electric field between the electrode pairs detects the feed flow F in two different horizontal directions. The measurement of the capacitance C between electrode pair 20a, 20b and the capacitance C between electrode pair 40a, 40b can occur either temporally one after the other at the same frequency or simultaneously at different frequencies. The measurement value for the signal Fm then results, e.g., from a linear combination of the measurement results for the two capacitances C, whereby expediently the difference of a measured capacitance value C to a capacitance value in a reference state is used.

Electrode pairs 20a, 20b and 40a, 40b can be arranged vertically offset, e.g., also in the flow direction, i.e., in the direction of passage of the mass flow through mass flow measuring device 11. In addition, in an arrangement with a plurality of electrode pairs, e.g., also according to FIG. 4, the capacitance between neighboring electrode pairs can also be measured and used accordingly for determining the total measured value Fm by means of tomographic methods. The increase in the number of the electrodes does basically improve the absolute accuracy of the mass flow measuring device configured as a flow meter and thus also of mass flow measuring device 11, but also increases the complexity and cost. Because the absolute accuracy, as stated above, in the case of mass flow measuring device 11 is not of critical importance, however, the optimum is more likely to be a low number of electrodes.

As an alternative to the evaluation with a plurality of electrodes, e.g., one or also more electrodes, particularly an electrode pair, can also be rotated mechanically about the feed flow F in the center, in order to detect it in several directions.

The electrodes used as taught by the invention can be attached further at the weighed unit of the differential metering scale of the invention, i.e., at the unit, the total weight of whih is determined by weight determining unit 3, or, in order to minimize force shunting via the feed lines, to a nonweighed unit of the differential metering scale.

A further possibility for improvement is to arrange a further electrode pair with a capacitance C2 of a similar type as measuring electrodes 20a and 20b in the vicinity of the measuring electrodes, whereby the feed flow F does not flow through the additional electrode pair. This additional electrode pair is then exposed to the same environmental influences as the measuring electrode pair 20a and 20b. The difference from the capacitances C and C2 then supplies a signal Fm, reduced by the environmental influences, for the feed flow through feed flow measuring device 11.

According to an exemplary embodiment of the invention, the simple feed flow measuring device 11 can also determine other physical properties of the mass flow, when these at least briefly have a fixed connection to the density or mass of the bulk solid. Possibilities are, e.g., the evaluation of the parameters of sound conduction through the bulk solid of the feed flow and/or of light transmission or light absorption, and/or the evaluation of magnetic properties in ferromagnetic bulk solids and/or the evaluation of the transmission behavior for electromagnetic microwaves and/or atomic particles. Many such measuring methods for material properties are known to the person skilled in the art in the particular specialty. Suitable systems of sensors necessary for measuring other physical properties of the bulk solids are known to the particular person skilled in the art. In principle, all measuring devices described in the introduction for mass flows can be used, whereby the optimum is the simple devices.

Figure 2:
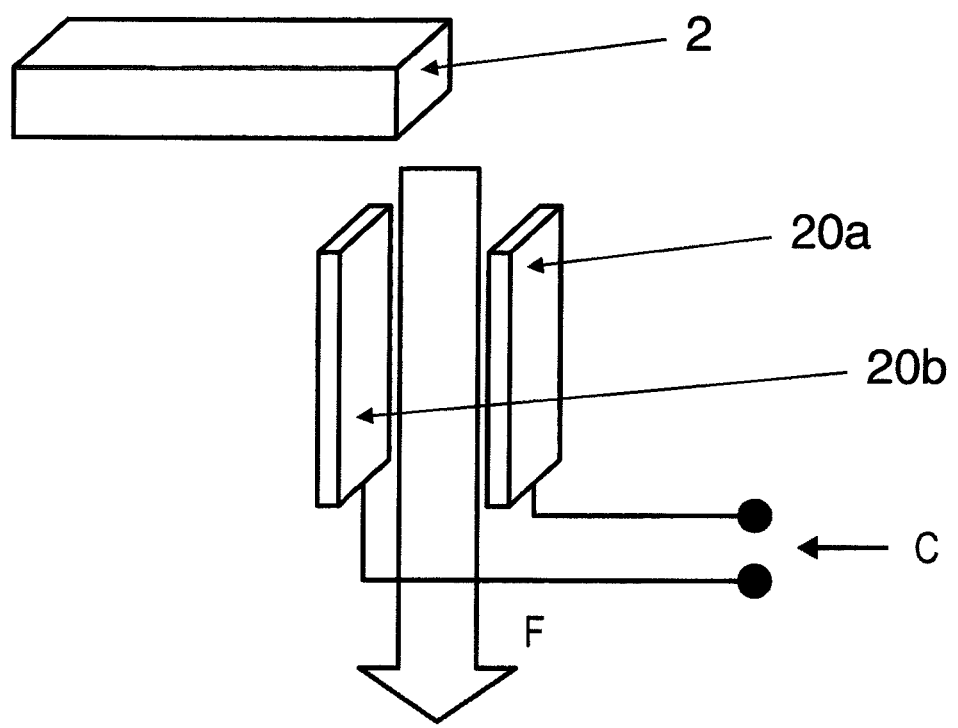
FIG. 2 is a schematic sketch of an embodiment of a mass flow measuring device within a differential metering scale of the invention for carrying out a method of the invention for gravimetric mass metering.

As in the case of mass flow measuring devices 11 described in FIG. 2 or 4, the sensors are installed such that the bulk solid and therefore the feed flow F flow through their measuring range.

Even if not absolutely necessary, as already described above, it is furthermore helpful, particularly in the case of target value changes, if mass flow measuring device 11 does not have too large tare and range errors. Therefore, adjustment of mass flow measuring device 11 leads to further improvement of the feed behavior at a variable target value W.

According to the state of the art, cf., e.g., Vetter: "Handbuch Dosieren," ISBN 3-8027-2199-3; Chapter "Weigh belt feeders with automatic control and correction device," flow sensors are often calibrated in that the bulk solid that has passed through the sensor is collected in a container. When this is applied to the invention, for the adjustment of mass flow measuring device 11, the weight difference between the bulk solid collected in an additional container after passing through mass flow measuring device 11 and the integral of the bulk solid flow determined by mass flow measuring device 11 can be used for correcting the measurement results of mass flow meter 11 (not shown in the figures).

For adjustment of mass flow measuring device 11, however, e.g., the amount of material removed from container 1 and conveyed through mass flow measuring device 11 can also be compared with the amount determined by mass flow measuring device 11, and mass flow measuring device 11 can be calibrated accordingly (not shown in the figures).

However, this method always requires a sufficiently large amount of bulk solids, so that the measurement error in the determination of the amount from the weight difference at container 1 is sufficiently small. Thus, mass flow measuring device 11 can be checked and recalibrated only at rather long intervals. Moreover, the method produces only one measurement value per measurement interval, so that the simultaneous correction of tare and range errors of mass flow measuring device 11 from one measurement is not possible in principle. Consequently, to correct both values, at least two measurements at different feed rates are necessary.

A comparable adjustment preferred according to the invention can also occur constantly, however. To this end, e.g., according to the embodiment of the invention shown in FIG. 3, the signal P of the differential metering scale and the signal Fm of the mass flow measuring device can be supplied to an additional identification device 30 of the differential metering scale. Identification device 30 determines a static relationship from the two signals P and Fm for different mass flows, e.g., by identification methods known to the person skilled in the art, whereby this is expediently stored as a characteristic. The thus determined relationship can then be supplied to an additional correction device 31 of the differential metering scale. In addition, correction device 31 is supplied with the current second signal Fm representing the mass flow, and the determined relationship can then be used so that correction unit 31 linearizes or adjusts the current signal Fm. Regulating device 12 is thereupon supplied with a second but linearized or adjusted signal Fm1, representing the mass flow F, only after linearization or adjustment of the second signal Fm representing the mass flow F. Second regulating device 12 thus calculates the second control signal Y2, based on this second but linearized or adjusted signal Fm1, representing the mass flow F, and the first control signal Y.

An embodiment of the method of the invention according to FIG. 3 operates during the entire gravimetric metering phase of the differential metering scale and thus assures at each point in time the correct determination of the bulk solid flow and the integral accuracy of the metering. The tare and range errors of mass flow measuring device 11, remaining after the correction by correction device 31, are automatically corrected by the higher-level regulating device 6. A separate breakdown by the two error causes is not necessary.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for the gravimetric mass metering of bulk solids via a container with the bulk solid to be metered and a volumetric conveying device, with which the bulk solid coming from the container is conveyed with a mass flow, whereby the mass flow temporally follows a target value for a target feed rate, wherein to determine the mass flow the method comprises:
   determining, by a weight determining unit, a signal that represents a total weight of a unit formed by the container and the bulk solid included in the container or by the container and conveying device and the bulk solid included in the container and the conveying device,
   processing the signal representing the total weight in order to calculate a first signal representing the mass flow,
   calculating, by a first regulating device, a first control signal based on the first signal and the target value for the target feed rate,
   measuring, by a mass flow measuring device, a second signal that represents the mass flow that leaves the conveying device;
   calculating, by a second regulating device, a second control signal based on the second signal representing the mass flow and the first control signal; and
   providing the second control signal to a drive of the conveying device for controlling the conveying device,
   wherein the second signal representing the mass flow is supplied from the mass flow measuring device directly to the second regulating device.

2. The method according to claim 1, wherein the second signal, representing the mass flow, increases monotonically or decreases monotonically with a size of the mass flow.

3. The method according to claim 1, wherein the second signal, representing the mass flow, follows an actual mass flow more rapidly than the first signal, representing the mass flow calculated from the signal representing the total weight.

4. The method according to claim 1, wherein the second signal, representing the mass flow, is determined from a capacitance dependent on the bulk density of the bulk solid between a pair of electrodes.

5. A method for the gravimetric mass metering of bulk solids via a container with the bulk solid to be metered and a volumetric conveying device, with which the bulk solid coming from the container is conveyed with a mass flow, whereby the mass flow temporally follows a target value for a target feed rate, wherein to determine the mass flow the method comprises:
   determining, by a weight determining unit, a signal that represents a total weight of a unit formed by the container and the bulk solid included in the container or by the container and the conveying device and the bulk solid included in the container and the conveying device,
   processing the signal representing the total weight in order to calculate a first signal representing the mass flow,
   calculating, by a first regulating device, a first control signal based on the first signal and the target value for the target feed rate,
   measuring, by a mass flow measuring device, a second signal that represents the mass flow that leaves the conveying device;
   calculating, by a second regulating device, a second control signal based on the second signal representing the mass flow and the first control signal; and
   providing the second control signal to a drive of the conveying device for controlling the conveying device,
   wherein an identification unit determines a static relationship between the first signal representing the mass flow and the second signal representing the mass flow, and wherein the determined static relationship is used by a correction device to linearize or to adjust the second signal representing the mass flow and only after the linearization or adjustment of the second signal representing the mass flow, the second control signal is calculated from the linearized or adjusted second signal and the first control signal, and
   wherein the second signal is supplied from the mass flow measuring device directly to both the correction device and the identification device.

6. A differential metering scale comprising:
   a container with a bulk solid to be metered;
   a volumetric conveying device with which the bulk solid coming from the container is conveyed with a mass flow, the mass flow following temporally a target value for a target feed rate;
   a differential filter device, which comprises a first regulating device;
   a weight determining unit configured to determine a total weight of a unit formed by the container and the bulk solid included in the container or by the container and the conveying device and the bulk solid included in the container and the conveying device, and configured to output a signal representing the total weight and transmit the total weight to the differential filter device,
      wherein the differential filter device being configured to calculate a first signal representing the mass flow from the signal representing the total weight and configured to calculate a first control signal from the first signal representing the mass flow and the target value for the feed rate;
   a second regulating device; and
   a mass flow measuring device arranged such that the bulk solid, after leaving the conveying device, passes through the mass flow measuring device and the mass flow measuring device calculates a second signal representing the mass flow, wherein the second regulating device being configured to calculate a second control signal based on the second signal representing the mass flow and the first control signal and supplies the second control signal to a drive of the conveying device for controlling the conveying device, and wherein the second signal representing the mass flow is supplied from the mass flow measuring device directly to the second regulating device.

7. The differential metering scale according to claim 6, wherein the differential filter device further comprises a differentiation unit and a filter unit, and wherein the differentiation unit differentiates the signal output by the weight determining unit, wherein the filter unit filters the differentiated signal according to at least one algorithm filter in order to calculate the first signal representing the mass flow, and wherein the first regulating device calculates the first control signal from the first signal representing the mass flow and the target value for the feed rate.

8. The differential metering scale according to claim 6, wherein the mass flow measuring device is installed below a mass flow dropping point of the conveying device and wherein, depending on a distance between the mass flow measuring device and the mass flow dropping point, dynamics of a closed loop control is manipulated via the second regulating device.

9. The differential metering scale according to claim 6, wherein the mass flow measuring device is configured to determine the second signal representing the mass flow from an electrical capacitance dependent on the bulk density of the bulk solid between a pair of electrodes.

10. The differential metering scale according to claim 9, wherein the pair of electrodes are made planar or curved.

11. The differential metering scale according to claim 10, wherein the pair of electrodes detect the mass flow each in different horizontal directions.

12. The differential metering scale according to claim 10, wherein the pair of electrodes are arranged vertically offset in a pass-through direction of the mass flow through the mass flow measuring device.

13. The differential metering scale according to claim 10, wherein the pair of electrodes are mechanically rotatable about the mass flow.

14. The differential metering scale according to claim 6, wherein the mass flow measuring device measures the flow of bulk solids.

15. The differential metering scale according to claim 6, wherein the mass flow measuring device evaluates parameters of sound conduction through the bulk solid of the mass flow.

16. The differential metering scale according to claim 6, wherein the mass flow measuring device evaluates parameters of light transmission or light-absorption through the bulk solid of the mass flow.

17. The differential metering scale according to claim 6, wherein the mass flow measuring device evaluates magnetic properties of the bulk solid of the mass flow in the case of ferromagnetic bulk solids.

18. The differential metering scale according to claim 6, wherein the mass flow measuring device evaluates transmission behavior for electromagnetic microwaves or atomic particles of the bulk solid of the mass flow.

19. A differential metering scale comprising:

a container with a bulk solid to be metered;

a volumetric conveying device with which the bulk solid coming from the container is conveyed with a mass flow, the mass flow following temporally a target value for a target feed rate;

a differential filter device, which comprises a first regulating device;

a weight determining unit configured to determine a total weight of a unit formed by the container and the bulk solid included in the container or by the container and the conveying device and the bulk solid included in the container and the conveying device, and configured to output a signal representing the total weight and transmit the total weight to the differential filter device, wherein the differential filter device being configured to calculate a first signal representing the mass flow from the signal representing the total weigh and configured to calculate a first control signal from the first signal representing the mass flow and the target value for the feed rate;

a second regulating device;

a mass flow measuring device arranged such that the bulk solid, after leaving the conveying device, passes through the mass flow measuring device and the mass flow measuring device calculates a second signal representing the mass flow, wherein the second regulating device being configured to calculate a second control signal based on the second signal representing the mass flow and the first control signal and supplies the second control signal to a drive of the conveying device for controlling the conveying device;

an identification device; and a correction device, wherein the identification device is configured to determine a static relationship from the first signal, representing the mass flow, and the second signal, representing the feed mass flow, wherein the correction device is configured to linearize or to adjust the second signal, representing the mass flow, based on the determined static relationship, and to supply a second linearized or adjusted signal, representing the mass flow, to the second regulating device only after linearization or adjustment of the second signal, representing the mass flow, so that the second regulating device calculates the second control signal only based on the second linearized or adjusted signal representing the mass flow and the first control signal, and wherein the second signal is supplied from the mass flow measuring device directly to both the correction device and the identification device.

20. The differential metering scale according to claim 19, wherein the first signal representing the mass flow is supplied to both the first regulating device and the identification device.

* * * * *